US006489754B2

(12) United States Patent
Blom

(10) Patent No.: US 6,489,754 B2
(45) Date of Patent: Dec. 3, 2002

(54) SWITCHED MODE POWER SUPPLY HAVING A BOOST CONVERTER OPERATIVELY COMBINED WITH A FLYBACK CONVERTER

(75) Inventor: Anton Cornelis Blom, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/022,126

(22) Filed: Oct. 30, 2001

(65) Prior Publication Data
US 2002/0097030 A1 Jul. 25, 2002

(30) Foreign Application Priority Data
Nov. 1, 2000 (EP) .............................. 00203804

(51) Int. Cl.[7] ................................................ G05F 1/10
(52) U.S. Cl. ..................................................... 323/222
(58) Field of Search ................................. 323/224, 222, 323/282, 229, 232

(56) References Cited

U.S. PATENT DOCUMENTS 4,930,061 A * 5/1990 Slack et al. ................ 323/208
5,353,213 A   10/1994 Paulik et al. ................. 363/19
5,636,114 A * 6/1997 Bhagwat et al. .......... 363/56.12
5,654,626 A * 8/1997 Karlsson ..................... 323/222
5,943,200 A * 8/1999 He .............................. 361/113
5,999,419 A   12/1999 Marrero ....................... 363/21
6,043,636 A * 3/2000 Gaudreau et al. ........... 323/282
6,373,725 B1 * 4/2002 Chang et al. ................ 323/222

FOREIGN PATENT DOCUMENTS

EP        0516377 A2    12/1992

* cited by examiner

Primary Examiner—Shawn Riley
(74) Attorney, Agent, or Firm—Edward W. Goodman

(57) ABSTRACT

A switched mode power supply includes an input for receiving an input signal voltage, a flyback converter circuit arrangement and an output for delivering a regulated output signal voltage. The switched mode power supply further includes a boost converter arranged to be operatively combined with the flyback converter, and functioning such that the combined converter operates in a boost mode when the input voltage is above a threshold value, and in a flyback mode when the input voltage is below the threshold value.

10 Claims, 3 Drawing Sheets

SWITCHED MODE POWER SUPPLY HAVING A BOOST CONVERTER OPERATIVELY COMBINED WITH A FLYBACK CONVERTER

BACKGROUND OF THE INVENTION

1. Field of the Invention

The present invention relates to a switched mode power supply having an input for receiving an input signal voltage, a flyback converter circuit arrangement and an output for delivering a regulated output signal voltage.

2. Description of the Related Art

Switched mode power supplies find ready use as power regulators in view of characteristics, such as, a high efficiency, a relatively light weight, a relatively small dimension, and a relatively low power dissipation. However, a particular disadvantage that can limit the adoption of a switched mode power supplies relates to their noise performance, and in particular line voltage harmonic distortion.

As an example, U.S. Pat. No. 5,353,213 discloses a flyback converter which is arranged to generate an additional voltage for charging a capacitor which is arranged to supply the required energy for the converter in the regions of the zero crossings of the input line signal voltage.

SUMMARY OF THE INVENTION

The present invention seeks to provide a switched mode power supply exhibiting advantages over known such supplies and which, in particular, exhibits, an improved line voltage harmonic distortion performance.

According to the present invention, there is provided a switched mode power supply of the type defined above, characterized in that the switched mode power supply includes a boost converter arranged to be operatively combined with the said flyback converter.

The advantageous combination of the boost and flyback functions within such a converter serves to improve the noise performance of the converter and can, in particular, lead to advantages of line voltage harmonic reduction.

The feature of the switched mode power supply as described above and including a diode in series with a boost inductor at the boost converter and a further diode in series with a flyback inductor of the flyback converter, is advantageous in separating current paths within the converter so as to prevent undesired reverse current through the flyback inductor.

The feature of the switched mode power supply as described above and including a boost inductor and a flyback inductor combined in a single inductor in series with the input, is advantageous in providing for a simplified arrangement in which the power supply can switch between boost and flyback modes.

The features of the switched mode power supply described above, wherein said combined inductor comprises a tapped inductor having a tap derived from the output of the converter, and wherein the combined inductor comprises a tapped inductor having a tap derived from the line voltage input, are advantageous in providing means for readily controlling the switching between boost and flyback modes.

The feature of the switched mode power supply as described above, which further includes an additional boost inductor connected in series with the said first boost inductor, and which further includes an additional inductor in the form of a flyback inductor connected between the input and the output, are advantageous in controlling the switch-over point between the two modes of operation.

BRIEF DESCRIPTION OF THE DRAWINGS

The invention is described further hereinafter, by way of example only, with reference to the accompanying drawings in which.

DESCRIPTION OF THE PREFERRED EMBODIMENTS

Figure 1:
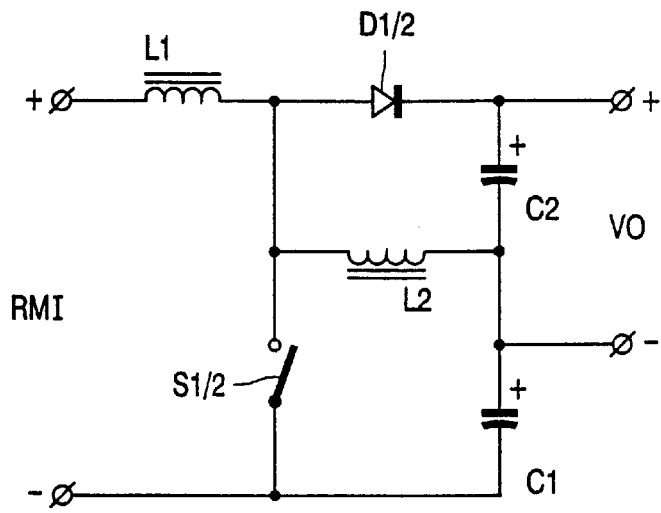
FIG. 1 illustrates a theoretical circuit arrangement according to an embodiment to the present invention.

Turning first to FIG. 1, there is illustrated a theoretical circuit topology which can be derived from a combined boost-buck power converter in which the capacitors thereof are rearranged.

As result of the rearranged capacitors, the boost-buck converter topology has been changed to the boost-flyback converter topology.

In this theoretical example, the diode of the flyback converter is combined with the diode of the diode of the boost converter.

The arrangement includes a boost inductor L1, a combined diode D1/2 element, a boost capacitor C1, an output capacitor C2, a flyback inductor L2 and a switching element S1/2. The boost output capacitor is then formed by the combination of the two series capacitors C1 and C2.

A rectified line input voltage RMI is applied to the input. A stabilized or output voltage is supplied to the output.

A significant voltage ripple is present on the boost capacitor C1 with a frequency of double the input line voltage frequency. On the output capacitor C2, virtually no ripple voltage appears although this does depend on the control behavior of the control logic.

As long as the inductor currents do not change sign, the converter will operate as expected. However, in practical applications, this cannot be guaranteed for all operating conditions, and so this circuit would not tend to be adopted.

The circuit illustrated in FIG. 1 can operate effectively as long the current in the inductor L2 is not equal to zero. At the moment the current falls to zero, and the switch S1/2 is not switched on, a reverse current will flow through the inductor L2. The converter would then operate in an undesired mode, and so, such a situation must be prevented.

Based on the topology of FIG. 1, the two current paths can be separated by the use of additional diodes D2 and D3, and this helps to overcome the above-described problem.

Figure 2:
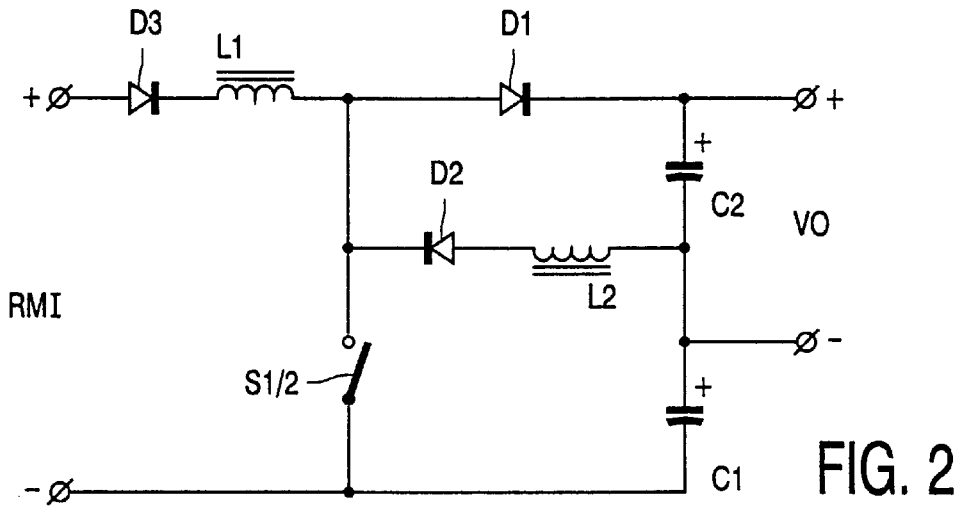
FIG. 2 illustrates a practical realization of the embodiment illustrated in FIG. 1.

This revised arrangement is illustrated in FIG. 2. The additional diodes D2, D3 serve to prevent the aforementioned two current paths influencing each other.

The boost and the flyback converter elements are both controlled by the same switch S1/2, as the capacitor C1 is connected in series with the capacitor C2. For continuous inductor currents, the following equations can be derived:

For a DC input voltage, the transfer formula of the boost converter is:

$$(V_{c1}+V_{c2})/Vi=1/(1-\delta)$$

For a DC input voltage, the transfer formula of the flyback converter is:

$$V_{c2}/V_{c1}=\delta/(1-\delta)$$

For a DC input voltage, the transfer formula of the combined converter is then: $Vo/Vi=\delta/(1-\delta)$, where ($Vo=V_{c2}$).

Figure 3:
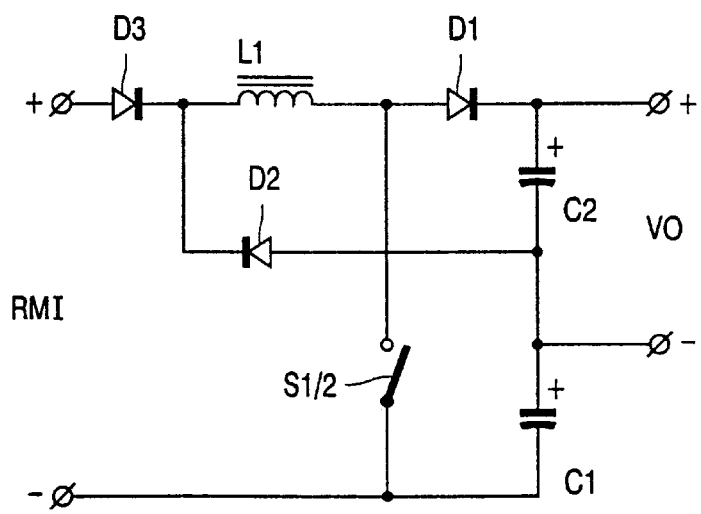
FIG. 3 illustrates a circuit arrangement according to an embodiment which represents a variation of the embodiment of FIG. 2.

As a further alternative, the two inductors of the combined converter of FIG. 2 can be rearranged and combined. This results in a different converter topology exhibiting a different behavior. This further alternative is illustrated in FIG. 3 and in which the current paths are changed resulting in a boost flyback topology with one inductor. A stabilized output voltage is supplied in parallel to capacitor C2.

Depending on the voltage on the capacitor C1, and the rectified input line voltage, the converter will switch between a boost mode and a flyback mode.

As long as the rectified input line voltage is higher than the voltage across the capacitor C1, the converter will act as a boost converter, transferring the energy from the rectified input line voltage to the series-connected capacitors C1 and C2.

At the moment the rectified input line voltage drops below the voltage across the capacitor C1, the converter will change its operation mode from boost to flyback mode. In this mode, the energy stored in the capacitor C1 is transferred to the output capacitor C2.

It should be appreciated that the line voltage current signal cannot generally be sinusoidal due to the fact that, during the time the converter is in the flyback mode, no energy is transferred from the rectified input line voltage to the converter. In addition, it should be noted that during the time the converter is in the boost mode, only one parameter can be controlled. However, with regard to line voltage harmonics, significant progress is made. If the output voltage is stabilized, the input current is not sinusoidal; and if the input current is controlled, the output voltage has a significant output voltage ripple. It should be noted that for several milliseconds around the zero crossings of the line voltage, the line voltage current will be completely equal to zero.

For deriving the transfer formula of the converter illustrated in FIG. 3, it is assumed that the output current is constant during at least one line voltage period.

For continuous inductor currents, the following equations can be derived, where $\delta 2$ is the time that the rectified input line voltage is lower than the voltage on the capacitor C1, and capacitor C1 is supplying the energy for the converter during the period $\delta 2$:

Energy balance capacitor $C1$: $\delta 2=V_{c1}/(V_{c1}+V_{c2})$

Switchover voltage: $\delta 2=2/\pi \text{ arc sin } (V_{c1}/(V_{I(peak)}))$

Combining the both formulae:

$$V_{c1}/(V_{c1}+V_{c2})=2/\pi \text{ arc sin } (V_{c1}/V_{I(peak)})$$

Figure 4:
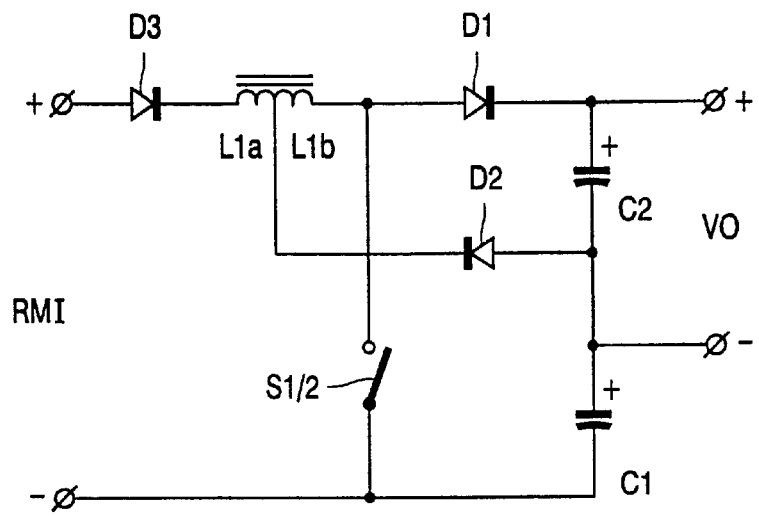
FIG. 4 illustrates a circuit arrangement of an embodiment which represents a variation of the embodiment illustrated in FIG. 3.

The inductor of the boost-flyback converter of FIG. 3 can be divided by creating a tapped inductor L1a–L1b so as to provide another embodiment of the present invention. This results in a converter topology as illustrated in FIG. 4 which exhibits a behavior that is equivalent to the behavior of the converter illustrated in FIG. 3. However, the current paths are changed resulting in a changed switchover point for the boost to flyback mode. The stabilized output voltage is again supplied in parallel to the capacitor C2.

The point at which the converter will switch between boost mode and flyback modes is determined, and can be selected, by the tap position of the tapped inductor L1a–L1b and the voltage on the capacitors C1 and C2. As long as the rectified input line voltage is higher than the voltage across the capacitor C1 multiplied by L1b/(L1a+L1b), the converter will act as a boost converter, transferring the energy from the rectified input line voltage to the two series-connected capacitors C1 and C2.

At the moment the rectified input line voltage drops below the voltage across the capacitor multiplied by L1b/(L1a+L1b), the converter will change operation from boost to flyback mode, transferring the energy stored in capacitor C1 to the output capacitor C2.

As before, the line voltage current cannot generally be sinusoidal due to the fact that, during the time the converter is in the flyback mode, no energy is transferred from the rectified input line voltage to the converter. The boost-tapped flyback converter of FIG. 4 has a different behavior with respect to the time the converter is in the boost- and flyback-mode, and the voltage on the capacitor C1. As with the previously described converter, it should be noted that during the time the converter is in the boost mode, only one parameter can be controlled. If the output voltage is stabilized, the input current is not sinusoidal; and if the input current is controlled, the output voltage has a significant output voltage ripple. As noted before, for several milliseconds around the zero crossings of the line voltage, the line voltage current will be completely equal to zero.

Figure 5:
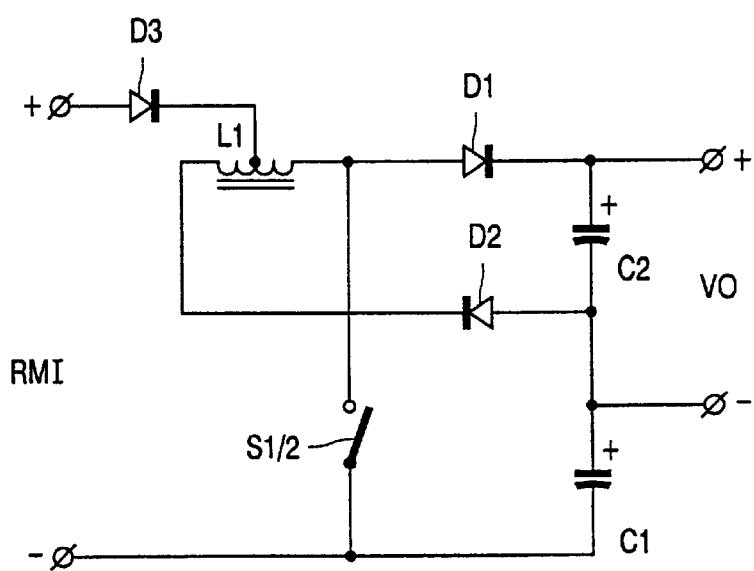
FIG. 5 illustrates a circuit arrangement of an embodiment which represents an alteration of the embodiment of FIG. 4.

Changing the line voltage input to the tap position and connecting the cathode of D2 to the left most position of L1a of FIG. 4, results in another variant of the converter embodying the present invention. This results in a converter topology with a behavior that is equivalent to the behavior of the converter described in relation to FIG. 4. This is illustrated in FIG. 5 in which the current paths are changed resulting in a changed switchover point for the boost to flyback mode. The stabilized output voltage is supplied in parallel to capacitor C2.

Depending on the tap position of the tapped inductor and the voltage on the capacitors C1 and C2, the converter will switch between boost mode and flyback mode.

As long as the input line voltage is higher than the voltage across the capacitor C1 times (L1a+L1b)/L1b, the converter will act as a boost converter, transferring the energy from the line voltage to the series connected capacitors C1 and C2.

At the moment the line voltage drops below the voltage across the capacitor C1 multiplied by (L1a+L1b)/L1b, the converter will change its operation mode from boost to flyback mode, transferring the energy stored in capacitor C1 to the output capacitor C2.

As above, the line voltage current cannot be generally sinusoidal due to the fact that, during the time the converter is in the flyback mode, no energy is transferred from the line voltage to the converter. The boost-tapped flyback converter of FIG. 5 has a different behavior with respect to the time the converter is in the boost and flyback mode, and the voltage on the capacitor C1.

Again, it should be noted that during the time the converter is in the boost mode, only one parameter can be controlled. If the output voltage is stabilized, the input current is not sinusoidal; and if the input current is controlled, the output voltage has a significant output voltage ripple. Again, for several milliseconds around the zero crossings of the line voltage, the line voltage current will be completely equal to zero.

Based on the topology of FIG. 4, an additional boost inductor can be included. This results in a converter topology, illustrated in FIG. 6, with an additional inductor L2 and which exhibits a behavior that is equivalent to the behavior of the converter of FIG. 4. However, while the current paths are similar, the switchover point for the boost to flyback mode is changed due to the additional boost inductor L2. As before, the stabilized output voltage is supplied in parallel to capacitor C2.

Depending on the values of the inductors L1 and L2 and the voltage on the capacitors C1 and C2, the converter will switch between three modes:

If the input line voltage is higher than the voltage across the capacitor C1 multiplied by (L1+L2)/L2, the converter will act as a boost converter, transferring the energy from the line voltage to the two series-connected capacitors C1 and C2. The boost-inductor is the series connection of L1 and L2. The energy from the line voltage is transferred to the capacitors C1 and C2.

At the moment the line voltage is between the voltage across the capacitor multiplied by (L1+L2)/L2 and the capacitor voltage itself, the converter will change its operation mode, to partially boost and partially flyback. A proportion of the energy from the line voltage is transferred to the capacitors C1 and C2, and a proportion of the energy stored in capacitor C1 is transferred to the output capacitor C2.

At the moment the line voltage drops below the voltage across the capacitor C1, the converter will change its operation mode to a fully flyback mode, transferring the energy stored in capacitor C1 to the output capacitor C2.

Figure 6:
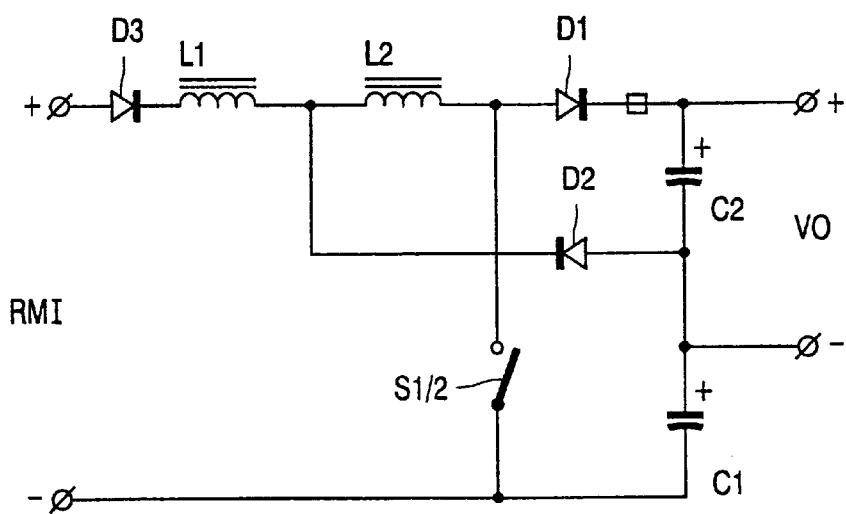
FIG. 6 illustrates a circuit arrangement of an embodiment which represents an alteration of the embodiment of FIG. 5.
Figure 7:
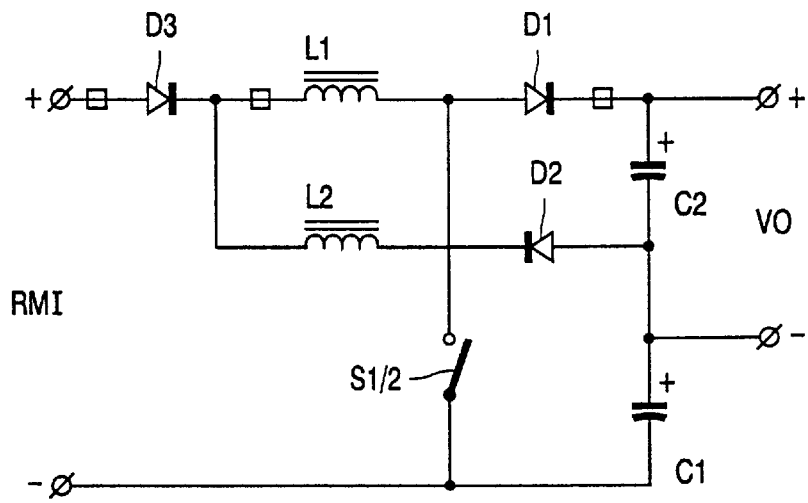
FIG. 7 illustrates a circuit arrangement of an embodiment which represents an alteration of the embodiment of FIG. 6.

Departing from the topology of FIG. 6, an additional flyback inductor, as illustrated in FIG. 7, can be employed instead of the additional boost inductor. This results in a converter topology with a behavior that is equivalent to the behavior of the converter described with reference to FIG. 6. As before, while the current paths are similar, the switchover point for the boost to flyback mode is changed due to the function of the additional inductor.

Depending on the values of the inductors L1 and L2 and the voltage on the capacitors C1 and C2, the converter will switch between three modes:

If the input line voltage is higher than the voltage across the capacitor C1, the converter will act as a boost converter, transferring the energy from the line voltage to the two series-connected capacitors C1 and C2. The boost-inductor is L1. The energy from the line voltage is transferred to the capacitors C1 and C2.

At the moment the line voltage is between the voltage across the capacitor C1 and the capacitor-voltage multiplied by L1/(L1+L2), the converter will change its operation mode to partially boost and partially flyback. A proportion of the energy from the line voltage is transferred to the capacitors C1 and C2, and a proportion of the energy stored in capacitor C1 is transferred to the output capacitor C2.

At the moment the line voltage drops below the voltage across the capacitor C1 multiplied by L1/(L1+L2), the converter will change its operation mode to a fully flyback mode, transferring the energy stored in capacitor C1 to the output capacitor C2.

In the aforementioned circuit arrangements, the buffer capacitor C1 is placed in series with the output capacitor C2 of the converter.

Figure 8:
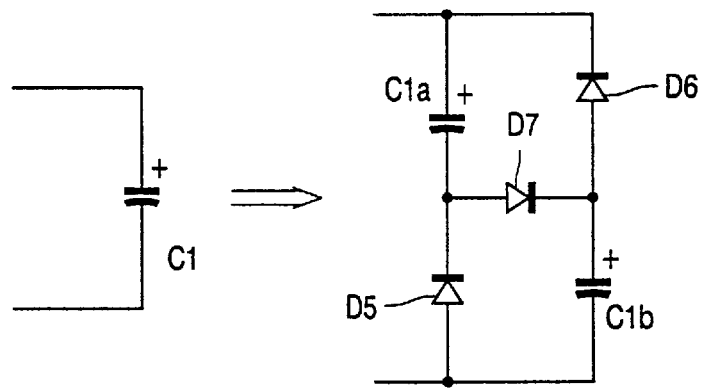
FIG. 8 illustrates an alternative capacitor arrangement for replacing the buffer capacitor found in the upper mentioned embodiments.

FIG. 8 illustrates an equivalent circuit arrangement comprising a divided buffer and which can be used, if required, in place of the buffer capacitor C1 of FIGS. 1 to 7.

A single capacitor, which is used to buffer the rectified line voltage during the zero crossing, has the disadvantage of having huge charging current every time the line voltage reaches its maximum value. The capacitor is feeding the load, which is connected in parallel to this capacitor, during almost the whole time. As result, the capacitor must be recharged to the peak line voltage every half cycle during the time the line voltage is at a high level. This causes extreme high peak charge currents.

The alternative circuit is developed in order to reduce the peak charge currents, which occurs during charging.

In combination with the proposed circuit, this capacitor arrangement has also some other advantages.

The advantage of such a capacitor arrangement of FIG. 8 is that the capacitors C1$a$ and C1$b$ are charged in series by diode D7 and are discharged in parallel by diodes D5 and D6. The load, which is connected in parallel to the cathode of diode D6 and the anode of diode D5, will be fed directly by the rectified input line voltage as long as the line voltage is above one-half of its maximum value. This is true for about two-thirds of the time, assuming that the line voltage is sinusoidal. Around the zero crossings, the two parallel-switched capacitors feed the flyback converter. The value of the capacitors can be rather low, due to the fact that the flyback converter is fed by the capacitors only during about one-third of the time.

The disadvantage of such a circuit is that the DC-input voltage for the flyback converter fluctuates from less than 50% to 100%, so the flyback converter must be capable of handling such voltages.

Use of this alternative buffer capacitor arrangement has the advantage that the combined converter of the present invention will then be supplied directly by the line voltage for a longer time period.

Figure 9:
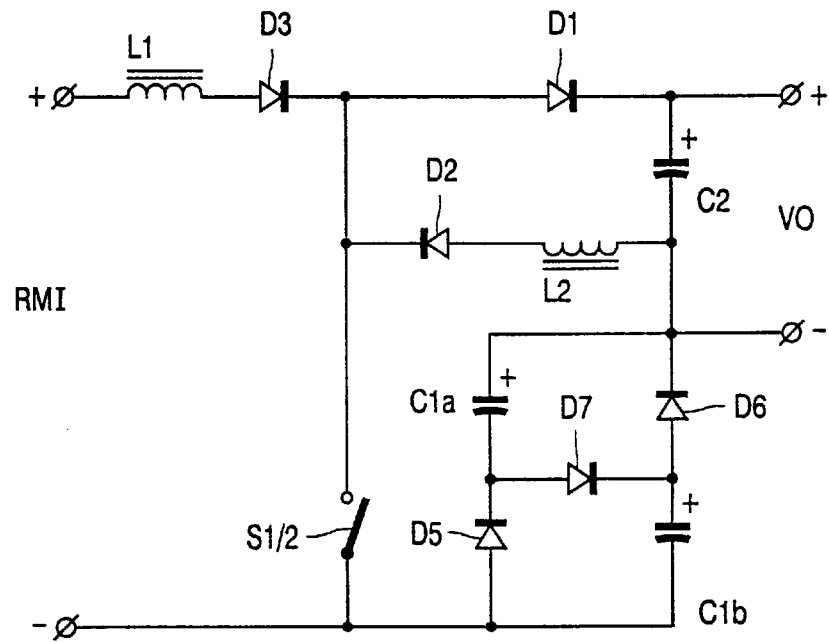
FIG. 9 illustrates a further variation of the present invention similar to the embodiment of FIG. 2 but adopting the capacitor arrangement of FIG. 8.

As merely one illustrated example, reference is made to FIG. 9 which corresponds to FIG. 2 but with the buffer capacitor replaced by the arrangement of FIG. 8.

The boost and the flyback converters both are controlled by the same switch S1/2. During charging (the line voltage is supplying energy to the converter), the capacitors C1$a$, C1$b$ and C2 are connected in series, whereas, during discharging of the capacitors, C1$a$ and C1$b$ are effectively connected in parallel.

For continuous inductor currents the following equations can be derived:

For DC input voltages, the transfer formula of the boost converter is: $(V_{c1a}+V_{c1b}+V_{c2})/Vi=1/(1-\delta)$.

For DC input voltages, the transfer formula of the flyback converter is: $V_{c2}/V_{c1a}=\delta/(1-\delta)$.

For DC input voltages, the transfer formula of the total converter is: $Vo/Vi=\delta/((1-\delta)(2-\delta))$, where $Vo=V_{c2}$.

The capacitor arrangement of FIG. 8, can be incorporated into any of the initially described embodiments.

As will be appreciated, the present application describes a variety of combined boost flyback circuit topographies which are advantageously arranged to operate in the boost mode when the input voltage is above a predetermined value, and in the flyback mode when the input voltage is below the predetermined value.

A principal advantage of the present invention arises when the combined regulator is operating in a steady state and so operates alternately in the boost and flyback modes.

As an example, when used in relation to a 50 Hz line voltage supply, the combined regulator operates as a flyback converter in the regions of the zero crossings of the line voltage; and as a boost converter in the upper regions of the line supply voltage. In the transition between these two regions, the converter operates partly in the boost mode and partly in the flyback mode, and in such a way that the voltage over the boost capacitor arrangement is equal to the momentary line voltage. Of course, due to the double-sided line voltage rectification employed, the combined converter finds itself, in each of the above described two possible modes, operating at 100 times per second. Particularly in view of the boost function of the combined converter according to the present invention, advantageous line voltage harmonic reduction is achieved and, in particular, with an advantageously limited number of components.

The advantages of a regulator embodying the present invention make it particularly attractive for use in relation to television displays and monitors in general.

It is considered that the embodiment of the present invention illustrated in relation to FIG. 3 and employing a single inductor is particularly advantageous with regard to the line voltage harmonic reduction. This particular topology can advantageously offer a good regulated output voltage with a small ripple voltage; a wide possible input voltage range in the order of 100 volts to 240 volts and, of course, as noted above, an improved performance with regard to line voltage harmonic reduction.

What is claimed is:

1. A switched mode power supply having:
   an input for receiving a rectified input AC signal;
   an output for delivering a regulated output voltage signal;
   an auxiliary circuit coupled in series with the output; and
   a boost converter coupled to receive the rectified input AC signal and delivering a boost output to a series connection of the output and the auxiliary circuit, characterized in that the switched mode power supply further comprises:
   a flyback converter, the flyback converter having a flyback input coupled to the auxiliary circuit and a flyback output coupled to the output.

2. The switched mode power supply as claimed in claim 1, wherein said switched mode power supply further comprises:
   a diode in series with a boost inductor at the boost converter; and
   a further diode in series with a flyback inductor of the flyback converter.

3. The switched mode power supply as claimed in claim 1, wherein said switched mode power supply further comprises a boost inductor and a flyback inductor combined in a single inductor in series with the input.

4. The switched mode power supply as claimed in claim 3, wherein the said combined inductor comprises a tapped inductor having a tap derived from the output of the converter.

5. The switched mode power supply as claimed in claim 3, wherein the combined inductor comprises a tapped inductor having a tap derived from the rectified input AC signal.

6. The switched mode power supply as claimed in claim 3, wherein said switched mode power supply further comprises an additional boost inductor connected in series with said single inductor.

7. The switched mode power supply as claimed in claim 3, wherein said switched mode power supply further comprises an additional inductor in the form of a flyback inductor connected between the input and the output.

8. The switched mode power supply as claimed in claim 1, wherein said switched mode power supply further comprises:
   a series arrangement of an inductor and a switch arranged between input nodes to receive a rectified input line voltage signal;
   a first capacitor coupled between a first and a second output node;
   a first recitifier coupled between the inductor and the first output node;
   a second capacitor arranged between the second output node and one of the input nodes;
   a second rectifier arranged in series with the inductor and being poled to be conductive when the switch is closed; and
   a third rectifier arranged between the inductor and the second output node and being poled to be conductive when the switch is closed.

9. The switched mode power supply as claimed in claim 3, wherein, when the rectified input AC signal is above a predefined threshold voltage, the switched mode power supply operates as a boost converter, and when the rectified input AC signal falls below the predefined threshold voltage, the switched mode power supply operates as a flyback converter.

10. The switched mode power supply as claimed in claim 1, wherein the transfer formula of the switched mode power supply is $(V_{c1}+V_{c2})/Vi=1/(1-\delta)$, where $V_{c1}$ is the output of the boost converter at the auxiliary circuit, $V_{c2}$ is the output of the boost converter at the output of the switched mode power supply, Vi is the rectified input AC voltage, and $\delta$ is the duty cycle of said switched mode power supply, a transfer formula of the flyback converter is $V_{c2}/V_{c1}=\delta/(1-\delta)$, where $V_{c1}$ is the input of the flyback converter, and $V_{c2}$ is the output of the flyback converter at the output of the switched mode power supply, and a transfer formula of the switched mode power supply is $Vo/Vi=\delta/(1-\delta)$, where Vo is the output voltage of the switched mode power supply.

* * * * *